Sept. 22, 1964 G. A. WALLACE 3,149,699
FRAME ENGAGING UNIT FOR VEHICLE HOISTS
Filed May 16, 1961 4 Sheets-Sheet 1

INVENTOR.
GEORGE A. WALLACE
BY
Lowell + Henderson
ATTORNEYS

Sept. 22, 1964   G. A. WALLACE   3,149,699
FRAME ENGAGING UNIT FOR VEHICLE HOISTS
Filed May 16, 1961   4 Sheets-Sheet 2

INVENTOR.
GEORGE A. WALLACE
BY Lowell & Henderson
ATTORNEYS

Sept. 22, 1964   G. A. WALLACE   3,149,699
FRAME ENGAGING UNIT FOR VEHICLE HOISTS
Filed May 16, 1961   4 Sheets-Sheet 3
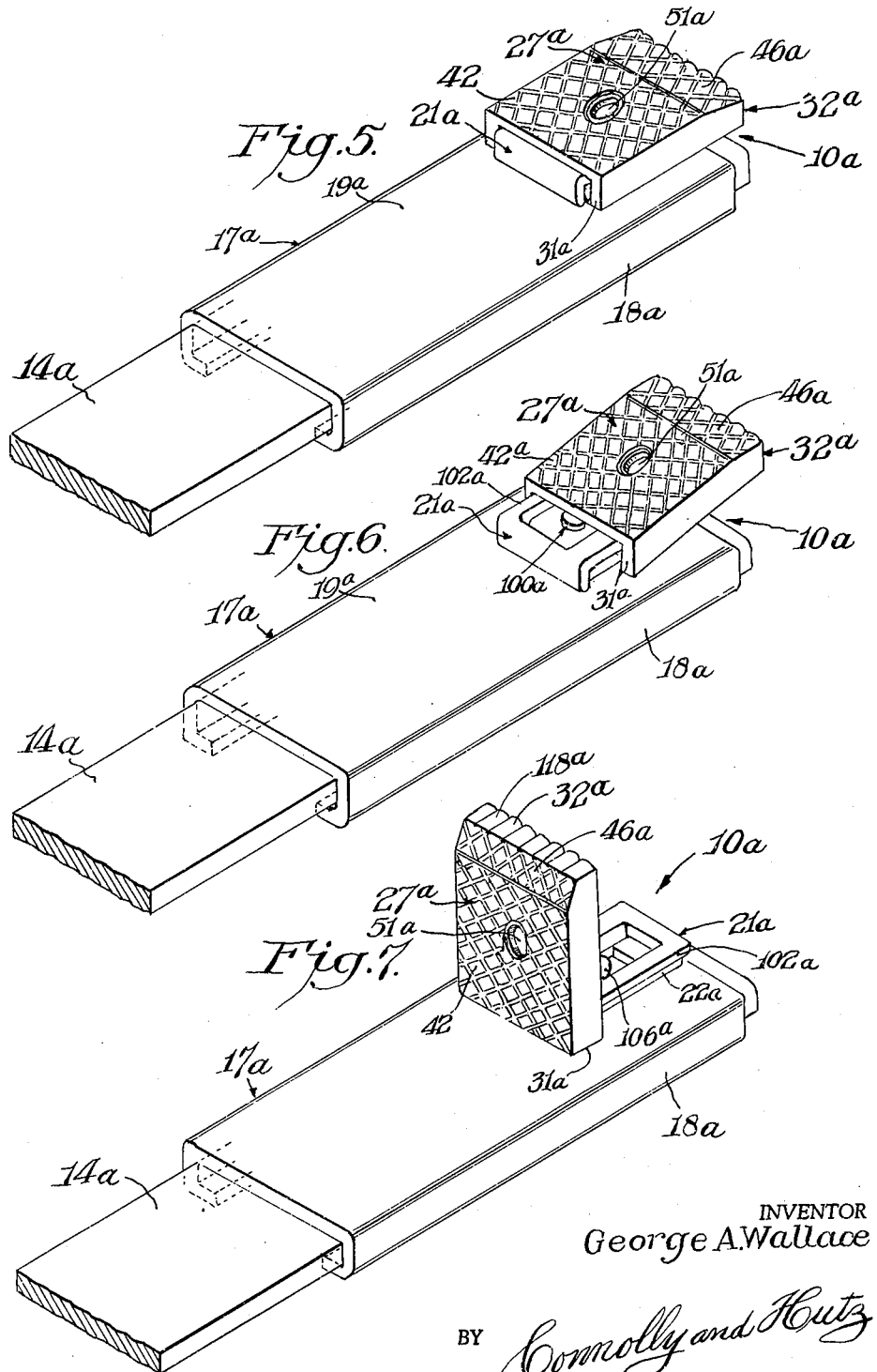
INVENTOR
George A. Wallace
BY Connolly and Hutz
ATTORNEYS

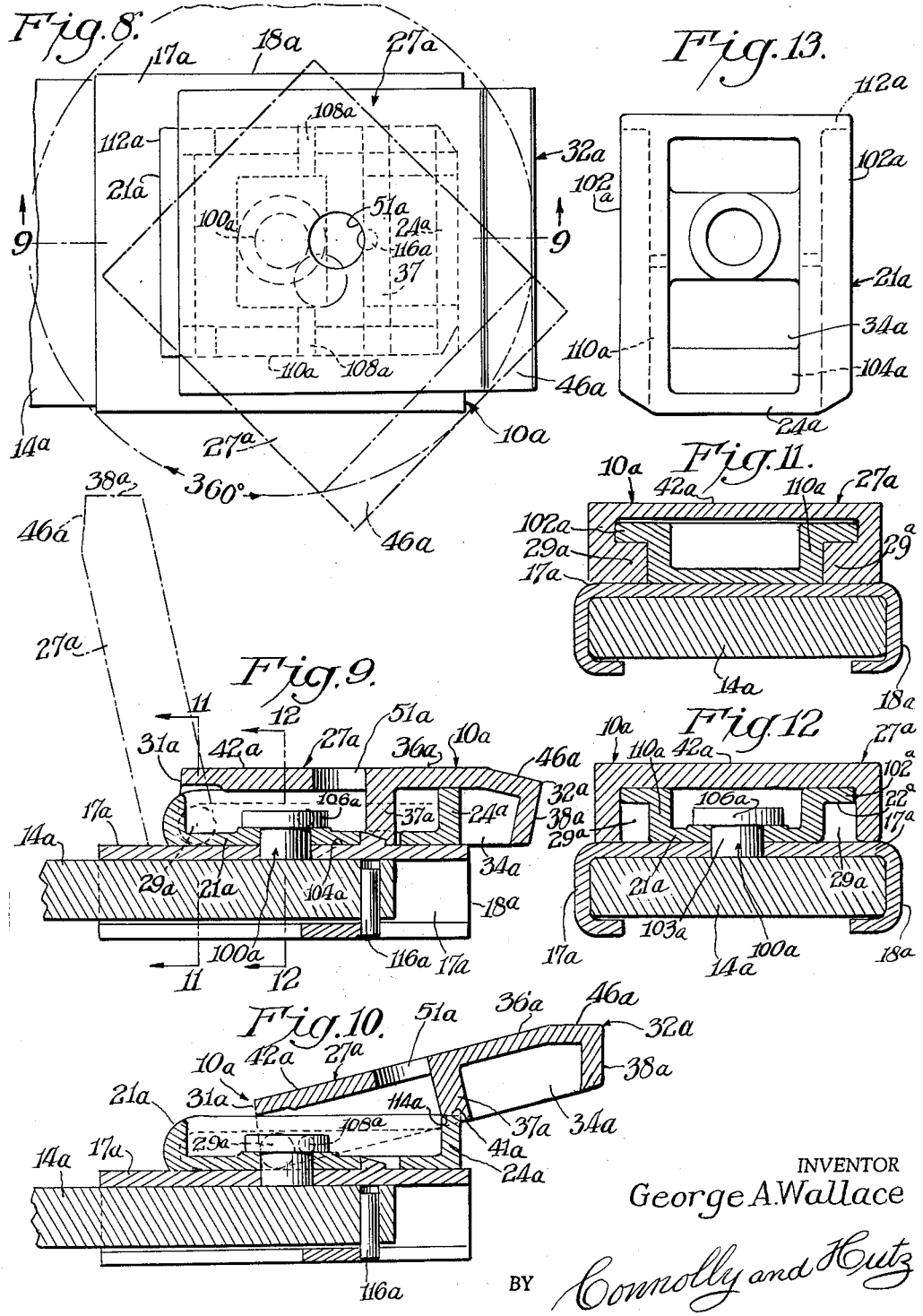

United States Patent Office 3,149,699
Patented Sept. 22, 1964

3,149,699
FRAME ENGAGING UNIT FOR VEHICLE HOISTS
George A. Wallace, Philadelphia, Pa., assignor to The Globe Hoist Company, Philadelphia, Pa., a corporation of Maryland
Filed May 16, 1961, Ser. No. 111,424
16 Claims. (Cl. 187—8.75)

This invention relates generally to vehicle hoists and more particularly to adjustably movable frame engaging units adapted to be mounted on hoists of the type which engage the frame of the vehicle.

With the advent of small sports cars and foreign made cars into the scene of the domestic cars, the problems of providing a universal type hoist for use in elevating all these various types of cars have become more numerous and complicated with each passing year. As is well known to those in this field, one type of hoist which goes far toward solving these problems is that which engages the frame of the vehicle.

One form of this type hoist includes a superstructure horizontally mounted on the upper end of a lift piston and wherein a plurality of support arms are pivotally carried on the superstructure for independent movement to positions for engaging those parts of the frame between the axles of the car. When there are no parts of the vehicle underhanging the frame, the support arms may be used directly for engaging the vehicle frame. However, in many instances, such parts as mufflers and other low-hanging obstructions are present; and with respect to light panel and pickup trucks, such parts as battery boxes, gas tanks, etc. depend well below the frame.

It is, therefore, an object of this invention to provide an improved frame engaging unit for a vehicle hoist, which unit is vertically adjustable to a plurality of positions whereby to adapt the hoist for use with all models of automobiles and small trucks now in use.

Another object of this invention is to provide a frame engaging unit for a vehicle hoist which is quickly and easily vertically adjustable by the operator to a plurality of positions after a car is positioned over the hoist.

A further object of this invention is to provide a frame engaging unit capable of the abovementioned objects and further which is movable longitudinally and transversely of the hoist to selected frame engaging positions.

Further objects, features and advantages of this invention will become apparent from a consideration of the following description when taken in connection with the accompanying drawings, wherein:

FIGS. 5–7 are perspective views of other vehicle frame-engaging units of this invention in different positions of use;

FIG. 8 is a plan view of the embodiment shown in FIGS. 5–7 in a relatively rotated position;

FIG. 9 is a cross-sectional view taken through FIG. 8 along the line 9—9;

FIG. 10 is a cross-sectional view similar to FIG. 9 in the intermediate position;

FIGS. 11 and 12 are cross-sectional views taken through FIG. 9 along respective lines 11—11 and 12—12; and FIG. 13 is a plan view of a support portion of the embodiment shown in FIGS. 5–7.

Figure 1:
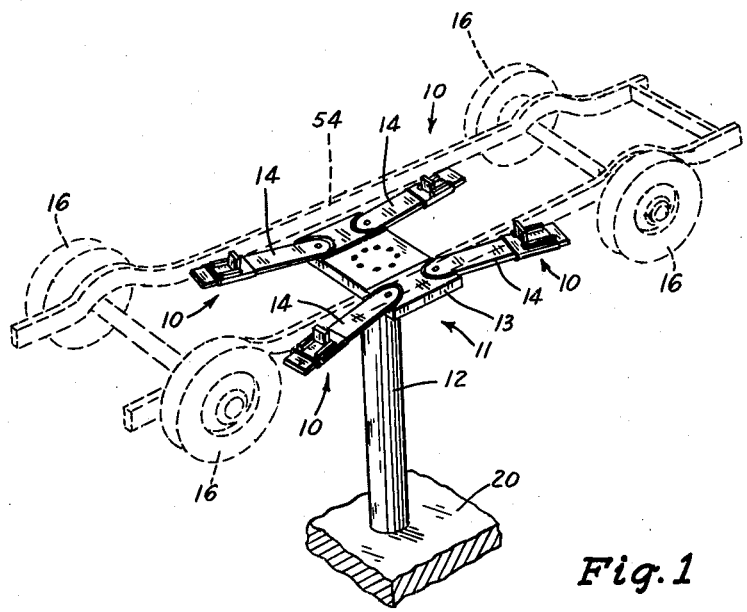
FIG. 1 is a perspective view of a vehicle hoist embodying the frame engaging units of this invention, and showing the units arranged to support a vehicle.

With reference to the drawings, four frame engaging pads or units of this invention, indicated generally at 10, are illustrated in FIG. 1 in assembly relation with a pit-mounted vehicle hoist 11 of a vehicle frame engaging type. The hoist 11 has a lift member or piston 12 and a superstructure including a transversely extended beam or plate 13 secured to the upper end of the piston 12. A quartet of elongated, horizontally disposed vehicle frame engaging and supporting arms 14, of a flat plate construction, and pivotally secured each by means of a bolt 15 to the corners of the plate 13. The frame supporting arms 14 are of a length to be positioned between the front and rear wheels 16 of a usual type automobile, and are horizontally movable to accommodate and underlie the side members of vehicle main frames (one being shown in dotted lines) of varying width. The lift piston 12 is cooperatively associated with a cylinder (not shown) mounted below the floor surface 20 and is raised and lowered in a well known manner by a hydraulic control system (not shown).

As shown in FIG. 1, each supporting arm 14 is provided with a unit 10. Since the frame engaging units 10 are of a like construction, only one unit 10 will be described in detail, with like numerals indicating like parts on the units 10.

Figure 3:
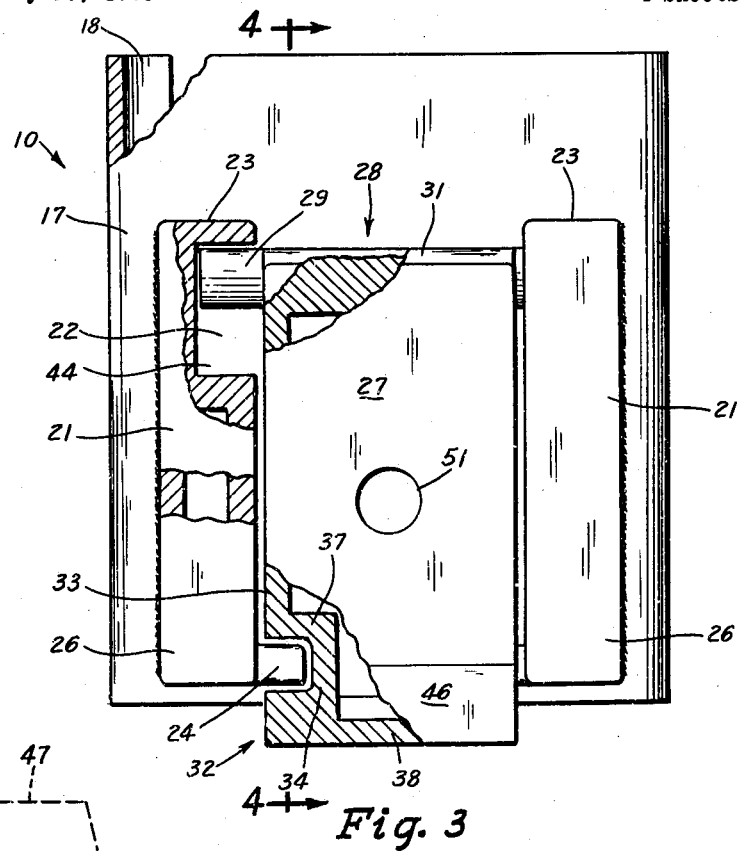
FIG. 3 is an enlarged detail plan view of a vehicle frame engaging unit, with certain parts broken away for the purpose of clarity.

A frame engaging unit 10 includes a channel shaped support or base member 17 of a size to be removably received on a frame supporting arm 14 in a straddling relation therewith and having inturned flanges 18 for engaging the opposite sides and the bottom of an arm 14. Secured to and extending upwardly from the top surface 19 (FIG. 4) of the support member 17, are a pair of longitudinally extended stationary side bars 21 (FIG. 3) arranged in a parallel, transversely aligned manner. The bars 21 are each provided with inwardly facing elongated slots 22 at one end 23, and with inwardly extended projections 24 at the other end 26 thereof. For the purpose of clarity, the end 23 shall be referred to as being at the rear end of the unit 10, and the end 26 as being at the front end thereof.

A movable center section 27 (FIG. 3) is adapted to lie between the stationary side bars 21 and is provided at one end 28 with a pair of laterally extended lugs 29, which are adapted to be slidably inserted within the slots 22 of the stationary side bars 21 for longitudinal and pivotal movement therein. Also at the end 28 of the center section 27, a flat, slightly inclined surface 31 (FIG. 4) is provided for a purpose hereinafter described. The other end 32 of the center section 27 is recessed at the sides 33 to form a pair of cavities 34 formed below the top wall 36 of the center section 27 to receive the projections 24 of the bars 21. It is noted that each projection 24 is straddled fore and aft (FIG. 4) by the front wall 38 of the center section 27, and by a portion 37 of a side 33. On the bottom 39 of each side 33 and behind each portion 37, a notch 41 (FIG. 4) is formed for a purpose hereinafter described.

In the assembly of the unit 10, the center section 27 is arranged with its lugs 29 inserted into the slots 22 of the side bars 21, and with the cavities 34 registerable with the inwardly extended projections 24 of the bars 21. By this arrangement, the center section 27 is adapted to assume any one of three vertically adjusted positions relative to the stationary side bars 21. In a first position, best illustrated in FIG. 4, the lugs 29 of the center section are at the rear of the slots 22 of the bars 21, and with the projections 24 received within the cavities 34 in an interlocked arrangement. In this position, the surfaces 42 and 43 respectively, of the center section 27 and the bars 21 are level with each other, and the front and rear ends 28 and 32 of the center section 27 rest upon and are supported by the top 19 of the support member 17 (FIG. 4).

Figure 4:
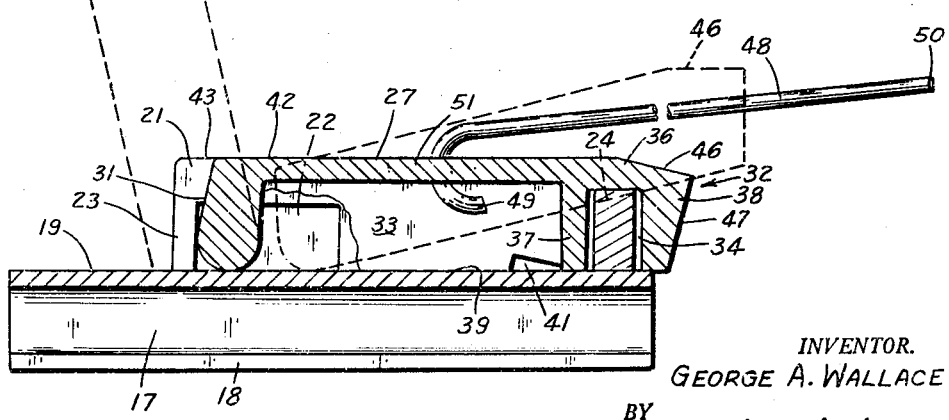
FIG. 4 is a cross-sectional view taken along the line 4—4 in FIG. 3, and showing changed positions of the unit in dotted lines.

In a second position, as illustrated in dotted lines in FIG. 4, the center section 27 has been moved forward by means of sliding the lugs 29 forward in the slots 22 such that the lugs 29 are positioned at the forward ends 44 of the slots 22, and the rear end 32 of the section is raised whereby the notches 41 on the bottom 39 of the center section sides 33 rest on top of the projections 24 of the bars 21. In this second or intermediate position of the unit 10, it is noted that the top surface 46 of the front wall 38 of the center section 27 is substantially horizontally disposed for a purpose hereinafter described.

In a third position of the center section 27 and of the unit 10, as also illustrated by dotted lines in FIG. 4, the lugs 29 are moved to the rear of the slots 22 and the section 27 is pivoted about the lugs 29 in a counterclockwise manner, until the inclined surface 31 at the rear end 28 of the center section rests on the top surface 19 of the support member 17. Further clockwise pivotal movement of the center section is prohibited by virtue of the surface 31 engaging the support member surface 19. In this third position, the front surface 47 of the front wall 38 is substantially horizontally disposed.

Figure 2:
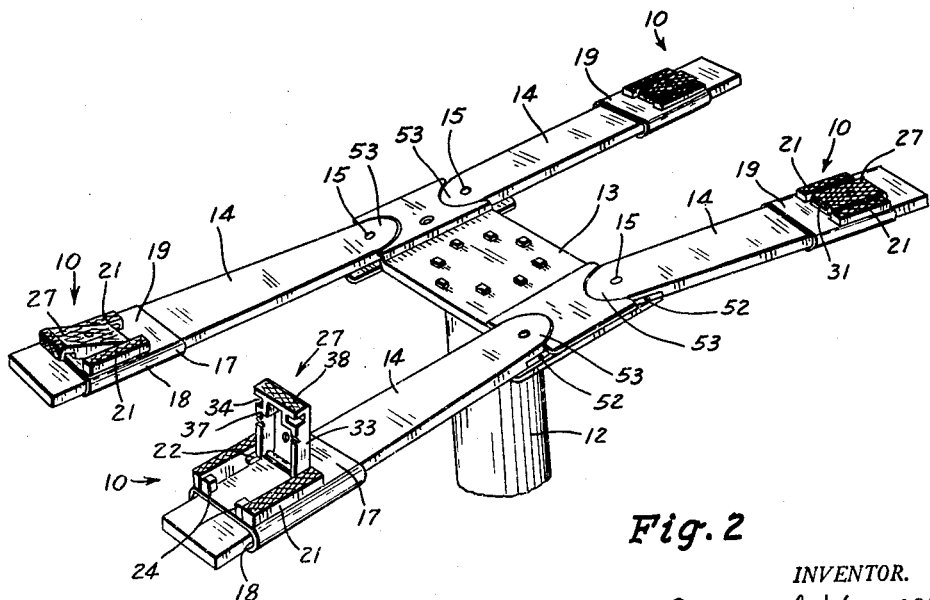
FIG. 2 is an enlarged perspective view of the hoist and the vehicle frame engaging units illustrated in FIG. 1, and illustrating various adjusted positions for the units.

In use, before the car to be raised is driven over the hoist 11 in its lowered position, the arms 14 are placed in a parallel manner to form an H shape with the superstructure 13. According to the make of the car, each pad 10 is then moved longitudinally to a predetermined position on its arm 14 by the use of markings (not shown) on the arms 14. A rod 48 (FIG. 4) having a hooked end 49 and a straight end 50 is used to move the pad 10. The hooked end 49 is inserted in a hole 51 formed centrally in the center section 27 for this purpose and by means of which the center section 27 is pivotally and longitudinally moved relative to the side bars 21. After adjusting the pads 10 longitudinally of their arms 14, the car is driven over the hoist, and by inserting the straight end 50 of the rod 48 in a hole 52 (FIG. 2) provided at the pivoted end 53 of each arm 14, the arms are swung to their proper position for the particular car frame 54 (FIG. 1).

In case the vehicle to be elevated has no under parts which might be engaged by the hoist 11 or the frame engaging units 10 if the hoist was raised with the units 10 in their flat positions, as best illustrated in FIG. 4, the units 10 are left in their first or flat positions, whereby upon the hoist being raised, the frame 54 (FIG. 1) is engaged by the level surfaces 42 and 43 of the center section 27 and the bars 21. However, in the event the vehicle to be elevated does have under parts which might be engaged by the hoist or the frame engaging units 10, the hooked end 49 of the rod 48 is inserted in the hole 51 and the front end 32 of the center section 27 is lifted upwardly and the section 27 is moved forwardly in the slots 22 until the projections 24 of the bars and the notches 41 are interlocked. In this second or intermediate position of the center section 27, such under parts as mufflers, etc. are cleared by the hoist parts, thus facilitating handling of the vehicle. Upon the hoist 11 being raised with the units 10 in their second or intermediate positions, the frame 54 of the vehicle is contacted by and will rest on the top surface 46 of the front wall 38, which surface 46 is substantially horizontally disposed.

In the event the vehicle has extremely low hanging parts, such as a battery box, gas tank, etc., the units 10 are pivoted about their lugs 29 by means of the rod 48 to a fully raised position (FIG. 4) where the maximum height of the units 10 insure adequate clearance for these parts, upon the hoist being raised to engage the frame. In this position, the frame 54 is engaged and rests on the horizontally disposed surface 47 of the center section front wall 46. Due to the height of the slots 22 being but slightly greater than the diameter of the lugs 29 and to the engagement of the surface 31 with the support surface 19, the center section 27 and the side bars 21 are again interlocked in the third position.

Should the vehicle to be elevated have an extremely low frame where there are no low hanging parts, and which will not clear the hoist 11 when the frame engaging units 10 are mounted thereon, the units 10 are readily moved off of the arms 14 by merely sliding the support members 17 off the ends of the arms 14, whereby on raising of the hoist 11 to elevate the vehicle, the frame 54 is engaged directly by the supporting arms 14.

In FIGS. 5–7 is shown another frame-engaging unit 10a in accordance with this invention, which is rotatable about a vertical axis as well as being adjustable to the aforementioned fully lowered, intermediate and fully raised positions respectively illustrated therein. Units 10a are mounted upon relatively elongated coupling sleeves 17a slidably connected upon support arms 14a by flanges 18a. Sleeves 17a can be removed and reversibly mounted upon arms 14a to position units 10a close to or remote from the point of support of arms 14a.

In FIGS. 8–13 are shown details of frame-engaging units 10a which permit them to function as described in FIGS. 5–8. Units 10a accordingly include a substantially flat base 21a, which is for example made in the form of a flanged head, as shown in FIGS. 9–13 to include a horizontal flange 102a extending laterally from an upper portion thereof to provide an elongated surface or slot 22a above surface 19a of support sleeve 17a. The bottom wall 104a of flanged head 21a is rotatably mounted upon support sleeve 17a by pin 100a including head 106a and stem 103a which is welded to sleeve 17a.

Frame-engaging element or pad 27a is slidably and rotatably engaged with base 21a about a horizontal axis by insertion of inwardly projecting lugs 29a within slots 22a. Pad 27a may, therefore, be rotated about a horizontal axis through lugs 29a to the three conditions of elevation shown in FIGS. 5–7 and 9 and 10. The forward and backward movement of pad 27a within slot 22a is confined by stop means within slot 22a, which are for example provided by spring pins 108a inserted in the side walls 110a of base 21a after assembly of pad 27a upon base 21a and by the downwardly directed continuation or rear flange 112a of horizontal flange 102a.

A projection 24a extends upwardly in the front of base 21a to provide a supporting surface 114a for intermediate lower surface 41a of step 37a extending downwardly within the bottom of frame-engaging element 27a. This provides a means for supporting frame-engaging element 27a in the position shown in FIGS. 6 and 10.

FIG. 9 shows in full outline frame-engaging element 27a nested over flanged head 21a with its upper surface 42a substantially parallel to upper surface 19a of support sleeve 17a or in other words in the horizontal position. FIG. 9 also shows in broken outline the fully raised position of pad 27a with its rear surface 31a resting upon upper surface 19a of sleeve 17a. FIG. 9 also shows the position of pin 116a which prevents sleeve 17a from inadvertently sliding off the end of arm 14a. Spring pin 116a can be driven into its recess to release sleeve 17a when desired for reversal of its engagement upon arm 14a.

FIGS. 5–13 accordingly illustrate another form of this invention in which frame-engaging elements 27a are rotatable about a vertical axis through pin 100a and rotatable about a horizontal axis through lugs 29a for alternately arranging it in the flat, intermediate and fully raised positions shown in FIGS. 5–7. Upper surface 42a of pads 27a may, for example, be roughened such as by casting grating patterns upon it to facilitate engagement with a portion of a frame of an automobile in the flat condition in which it is mostly used. The intermediate position shown in FIG. 6 provides extra clearance for ready access to tail pipes and mufflers; and may, for example, provide one and one-quarter inches of additional height. The maximum "up" position shown in FIG. 7 provides, for example, an additional seven and one-half inches such as is required for contacting truck chassis. The serrated end surface 118a helps prevent slipping when engaged with a chassis or part.

This application is a continuation-in-part of copending application Serial Number 822,531, filed June 24, 1959, now abandoned.

What is claimed is:

1. On a vehicle hoist having a longitudinal support arm, a frame-engaging unit comprising a substantially flat support, coupling means connecting said support to said arm, a substantially flat base mounted upon said support, a substantially flat frame-engaging element having a substantially flat upper surface and a blunt front end, sliding pivot means having a horizontal axis of rotation connecting the rear end of said frame-engaging element with said base whereby said frame-engaging element is slidable and rotatable relative to said base while engaged therewith, said frame-engaging element being rotatable about said sliding pivot means for disposing said front end in a raised position for engaging a vehicle frame, stop means reacting between said frame-engaging element and said support for maintaining said frame-engaging element in said raised position, said base and said frame-engaging element being formed to interengage each other in one position of said sliding pivot means to provide a substantially flat lowered position of said unit on which said flat upper surface of said frame-engaging element is horizontally disposed, projection means extending upwardly from said base, and an intermediate lower surface in the bottom of said frame engaging element being formed to engage said projection means in another position of said sliding pivot means for supporting said frame-engaging element in an intermediate raised position above said support.

2. A frame-engaging unit as set forth in claim 1 wherein said sliding pivot means comprises a pair of parallel slots and pins respectively disposed upon the rear ends of said base and said frame-engaging element.

3. A frame-engaging unit as set forth in claim 2 wherein said base incorporates a pair of spaced bars, said slots being formed within surfaces at the rear ends of said bars which face each other, said pins being inserted to slide and rotate within said slots, and said movable element being insertable between said bars.

4. A frame-engaging unit as set forth in claim 3 wherein said projection means comprises a pair of lugs extending inwardly from the front ends of said bars, said movable element incorporating recesses which receive said projection means in said flat lowered condition, and the bottom of said movable element incorporating a step which engages the top of said projection means for supporting said movable element in said intermediate condition when it is slid forward within said slots.

5. A frame-engaging unit as set forth in claim 1 wherein said support is rigidly connected to said base member.

6. A frame-engaging unit as set forth in claim 1 wherein pivot means rotatably mounts said base upon said support member.

7. A frame-engaging unit as set forth in claim 1 wherein said base comprises a flanged head, a horizontal flange extends laterally from the upper portion of said flanged head to provide an elongated space above said support, the bottom of said frame-engaging member being internally recessed for nesting over said flanged head with its upper surface substantially parallel to said base member in said lowered position, a pair of pivot shafts extending inwardly from the lower rear of said frame-engaging member and being inserted within said space, and stop means extending outwardly from said head within said space for limiting the backward and forward movement of said pivot shafts.

8. A frame-engaging unit as set forth in claim 7 wherein a step extends downwardly from the inner surface of said recessed bottom of said movable element for engaging the front end of said flanged head for supporting said movable element in said intermediate position.

9. A frame-engaging unit as set forth in claim 8 wherein said stop means at the rear of said flanged head is provided by a downwardly directed continuation of said horizontal flange at the rear of said flanged head.

10. A frame-engaging unit as set forth in claim 9 wherein a pair of pins are secured to the walls of said flanged head adjacent said space and extend outwardly within it to limit the forward movement of said pivot shafts.

11. A frame-engaging unit as set forth in claim 7 wherein said flanged head is rotatably secured to said support.

12. A frame-engaging unit as set forth in claim 7 wherein said base comprises a relatively flat structural box section.

13. A frame-engaging unit as set forth in claim 12 wherein a plate including a vertically disposed bearing is mounted across said box section.

14. A frame-engaging unit as set forth in claim 13 wherein said horizontal flange extends downwardly at the rear of said base to meet said support.

15. A frame-engaging unit for a vehicle hoist having a lift piston which carries a horizontally disposed and outwardly extended arm for supporting the frame of a vehicle to be elevated, said frame-engaging unit comprising, support means engageable with said arm for movement longitudinally thereof, stationary means mounted on said support means including a pair of transversely spaced, elongated elements each having an inwardly facing slot at one end and an inwardly extended projection at the other end, and a movable member adapted to lie between said elements and having outwardly extended lugs at one end thereof inserted within said slots whereby said member is pivotally and longitudinally movable relative to said stationary means, said member having inwardly extended cavities on each side at the other end thereof adapted to receive said projections so that said member is adapted to move from a first position resting on said support means and said stationary means, to a second vertically adjusted position with said other end of said member on top of and interlocked with said stationary means, said one end of said member having an inclined, flat portion intermediate said elements whereby said member is movable to a third substantially upstanding position with said flat portion resting on said support means.

16. A unit as set forth in claim 1 wherein said stop means comprises a support-engaging surface upon the rear of said frame-engaging element for contacting said support when said frame-engaging element is in said raised position for transmitting the weight of a vehicle resting upon said raised front end to said support.

References Cited in the file of this patent
UNITED STATES PATENTS

| | | |
|---|---|---|
| 1,968,416 | Mizer | July 31, 1934 |
| 2,659,455 | Green | Nov. 17, 1953 |
| 2,826,269 | Harr | Mar. 11, 1958 |
| 2,949,978 | Halstead | Aug. 23, 1960 |
| 3,036,662 | Pelouch | May 29, 1962 |